United States Patent Office 3,215,540
Patented Nov. 2, 1965

3,215,540
PROCESS OF CURING MEAT AND COMPOSITION THEREFOR
Eugen Wierbicki and Milton G. Tiede, Waterloo, Iowa, assignors to The Rath Packing Company, Waterloo, Iowa, a corporation of Iowa
No Drawing. Filed Nov. 2, 1962, Ser. No. 235,119
5 Claims. (Cl. 99—222)

This disclosure is a continuation-in-part of our earlier filed application, Serial No. 808,909, filed April 27, 1959, now U.S. Patent No. 3,134,678.

This invention relates to an improved process for preparing cooked, cured meats such as vacuum sealed canned and smoked hams.

Hams are normally cured by pumping arterially with a pickle solution and immersing them in a similar pickle solution for two days to a week or more. The pickle solution usually consists of salt, sugar, sodium nitrate, sodium nitrite and an alkaline phosphate salt such as sodium tripolyphosphate, sodium pyrophosphate, or disodium phosphate. The addition of the phosphate salt to the pickling solution substantially improves the yield of the cured meat product after cooking. It has the ability to bind the water or soluble protein in the meat so that it does not so readily escape during cooking. The resultant product is more juicy, has a higher yield, and is tender and of superior appearance because it does not shrink as much in cooking.

The alkaline phosphate salts, although providing improvement in the cooked meat yield, present certain disadvantages which are detrimental to the cured meat. During storage and after cure the disodium phosphate crystallizes out of the meat to impart a surface appearance resembling ground glass. Sodium tripolyphosphate forms crystalline "whiskers" on the surface of the meat and occasionally imparts a flat (low intensity) cured color to the meat, particularly during prolonged storage. Sodium tripolyphosphate also imparts occasionally what has been referred to as a "fishy" flavor to the meat.

It is the object of this invention to provide an improved pickling solution and curing process for fresh meats, which gives the improved meat yields, with solutions containing tripolyphosphate, sodium pyrophosphate and/or disodium phosphate without the disadvantages attendant on the use of these compounds.

Another object is to provide an improved pickling solution which is from 50% to 75% lower in cost than comparable phosphate materials used at the present time.

Another object is to provide an improved pickling solution which imparts enhanced flavor and color to the cured meat and which is sterilizing in its effect.

These and other objects and advantages can be achieved by adding to the conventional pickling solution an alkali hydroxide or an alkali bicarbonate or carbonate in combination with a small quantity of alkali citrate or citric acid. The conventional pickling solution used in the industry contains about 15 to 18% sodium chloride, 1 to 3% sugar and 0.1% to 0.2% of a soluble nitric oxide-forming salt (sodium nitrate and sodium nitrite). To this well known, basic pickling solution is added from 0.5 to 2.0% sodium hydroxide, or from 1.0 to 2.5% sodium bicarbonate or sodium carbonate together with from 0.25% to 1.0% of sodium citrate. The sodium citrate is added first for sequestering the alkaline earth metals of the pickle. The percentages set forth in this specification and in the appended claims are by weight based upon the total weight of the pickling solution. The solution preferably is pumped into the meat arterially or intramuscularly so that the meat has absorbed about 10% additional weight.

We have also found that sodium hydroxide without citrate ion may be used as the additive for the basic pickling solution. Sodium hydroxide provides all the advantages of the hydroxide-citrate additive over sodium tripolyphosphate, although it is slightly inferior to the hydroxide-citrate additive with respect to texture and yield-out-of-can of the finished meat product.

The pumped meat, hams for example, is then placed in a vat and covered with a curing "cover pickle," containing 12% sodium chloride, 2% sugar, and allowable amounts of sodium nitrate (0.1%) and sodium nitrite (0.15%). The meat is left in this cover pickle for five days for the equilibration of salt and other curing ingredients within the meat substance and to develop the desired cured meat color. (The meat will have increased in weight from 10 to 15% by reason of the added brine.) After five days in the cover pickle, the meat is removed and bulked in 40 to 45° F. cooler for removing the cover pickle physically adhered to the surface of the meat. The addition of the pickling solution should increase the pH of the meat to within the range of 6.3 to 6.8 after the cure has been completed.

A preferred pickling solution consists of the basic formulation containing salt, sugar, sodium nitrite and sodium nitrate plus 1.0 to 1.5% sodium hydroxide and 0.25 to 0.50% sodium citrate. This solution has a pH of from 11 to 12. The presence of the sodium hydroxide is very effective in killing bacteria in the pump pickle which may be spread to the meat from the pumping apparatus. When added in the quantity of about 10% by weight it will raise the pH of the cured meat to around 6.5. The sodium hydroxide may be replaced with sodium carbonate or sodium bicarbonate. In such case, however, a larger quantity of the carbonate must be used to obtain the desired elevation in pH, say 1.8 to 2%. The amount of citrate used with the carbonates is preferably from 0.7 to 1%.

When NaOH is used as the only additive the pickle is clear (no precipitate) and the pH runs in the range of 11.5 to 12.0 (0.7 to 1.5% NaOH in the solution). This pickle is practically sterile (3 and 5 counts per 1 ml.) and raises the pH of the cured meat to a pH of about 6.5 to 6.7. When the injection-pump technique is used for dispersing the pickle solution through the meat the distribution of the pickle within the meat tissue is sufficiently uniform so that a pH of below 7 prevails in all sections of the meat. This indicates that all of the hydroxyl ions introduced into the meat were neutralized to water and salt by the meat tissue. The concentration of the NaOH solution is inversely proportional to the weight added by pumping.

The fresh meat product such as pork ham, pork shoulder, ham pieces or other cut is pumped with the curing solution, cured by immersion in the cover pickle specified above, and processed as a vacuum sealed canned or fully cooked (non-canned) smoke product. Products prepared in this manner do not exhibit any of the undesirable salt crystallization or discoloration which seems to be inherent in the use of the alkali phosphates of the prior art.

Citric acid may be added to the brine in place of sodium citrate if desired. Either sodium citrate or citric acid dissolves in the brine solution to form citrate ions. The citrate ions serve as a sequestering agent for calcium and magnesium ions normally present in the meat and in tap water by forming complex ions with the calcium and magnesium to prevent precipitation of insoluble calcium and magnesium carbonates. When sodium carbonate is used with the sodium citrate in accordance with this invention it is desirable to employ a demineralized water rather than tap water and a pure grade of sodium chloride so that no additional carbonates are present in the solution. Any quantity of carbonates in excess of those added will tax the sequestering ability of the citrate anions and a calcium carbonate precipitate may form. This is undesirable because any precipitate of this kind will clog up the pumping equipment. The addition of citrate ions to the pickle improves both the flavor and the texture of the cured meat product. Presumably the finer texture imparted by reason of the addition of sodium citrate is the result of the bridging of meat muscle protein molecules by combining with the calcium ions naturally associated with the muscle protein.

The sodium citrate and sodium hydroxide may be added directly to the brine at any point during its preparation since these compounds are readily soluble in water. In this respect the present brine composition is superior to those containing the alkali phosphates such as sodium tripolyphosphate since it must be separately dissolved before adding to the brine.

However, in the case of sodium bicarbonate and sodium carbonate brines, sodium citrate must be dissolved first in the brine, prior to the additions of sodium bicarbonate or sodium carbonate. This allows sodium citrate to form soluble complexes with calcium and magnesium ions of the brine, thus making them unavailable for the formation of insoluble carbonates following the additions of sodium bicarbonate or sodium carbonate to the brine.

EXAMPLE I

To illustrate the improved water retention and improved quality properties of the cured meat of the invention as compared with a similar product prepared from a curing brine containing tripolyphosphate, the following tests were conducted. A basic brine solution was prepared containing 30 pounds of "Elixator Brine" (26% sodium chloride solution made by extracting a rock salt with tap water until the saturation point of sodium chloride), 15.5 pounds of tap water, .75 pound of sugar (sucrose), 107 ounces of sodium nitrite and .77 ounce of sodium nitrate. To one portion of the basic pickle solution, 1.6 pounds (3.3% in the total brine) of tripolyphosphate was added. This is referred to as "Pickle A." "Pickle B" was prepared by adding 145 grams (0.7%) of sodium citrate and 371 grams (1.8%) of sodium bicarbonate. "Pickle C" was prepared by adding 72.0 grams (0.35%) of sodium citrate and 165 grams (0.8%) of sodium hydroxide pellets. Sixteen pairs of hams were treated wherein Pickle A (left hams), as a control, were checked directly against Pickle B and against Pickle C (right hams). The hams were pumped arterially to add about 10% by weight of the pickling brine, which contains about 20% total solids. They were then covered with the cover pickle, described previously, for five days, followed by two days' buckling in a cooler at 40 to 45° F.

Eight of the sixteen pairs of the hams were skinned, boned, vacuum sealed, and cooked in a water retort until 150° F. internal temperature was attained. The cooking continued for an additional 30 minutes after the internal temperature of 150° F. had been reached in order to assure 150° F. temperature throughout all ham sections. These are referred to in Table I as VC canned hams. The other eight paired hams were cooked while smoking in a smokehouse until the internal temperature of 150° F. (referred to as fully cooked S.S. smoked hams) was attained. The hams were then checked for the yields, moisture content, pH, flavor and texture. The results are set forth in Table I. Each value is the average of several samples.

*Table I*

| Cured Meat Product | Quality Factor | Pumping Pickle | | |
|---|---|---|---|---|
| | | A (TPP) | B (Bicarbonate Citrate) | C (Hydroxide-Citrate) |
| Fully Cooked S.S. Smoked Hams. | 1. Percent pumped | 10.7 | 10.2 | 10.0 |
| | 2. Percent gain after 5 days curing in cover pickle. | 13.1 | 13.2 | 13.4 |
| | 3. Percent yield of the finished product compared to the green weight. | 96.4 | 94.7 | 96.0 |
| | 4. Percent total moisture | 72.1 | 71.7 | 72.2 |
| | 5. pH | 6.44 | 6.80 | 6.50 |
| | 6. Flavor [1] | 3.70 | 3.69 | 3.90 |
| | 7. Texture [1] | 3.80 | 3.82 | 3.82 |
| VC Canned Hams | 1. Percent pump | 10.4 | 10.2 | 9.8 |
| | 2. Percent gain after 5 days curing. | 12.3 | 13.1 | 12.7 |
| | 3. Percent gain after curing and 2 days bulking. | 9.5 | 10.8 | 10.5 |
| | 4. Percent yield of the finished product. | 99.0 | 100.3 | 98.5 |
| | 5. Percent total moisture | 66.9 | 64.7 | 68.1 |
| | 6. pH | 6.37 | 6.60 | 6.48 |
| | 7. Flavor [1] | 3.90 | 4.01 | 3.93 |
| | 8. Texture [1] | 3.96 | 4.00 | 3.97 |

[1] Numerical Scores for Flavor and Texture as Scored by Test Panel: 5.0 perfect; 4.5 excellent; 4.0 very good; 3.5 good; 3.0 moderately good; 2.5 fair; 2.0 poor; 1.0 very poor. The scores under 3.0 indicate unacceptable product.

EXAMPLE II

The experiment of Example I was repeated on twelve paired hams, of approximate weight of 10 pounds each, processed as vacuum cooked oval canned hams. The left hams were pumped to 10% weight of the green hams with the tripolyphosphate pump Pickle A, described in Example I. The right hams were subdivided into three groups, four hams each, and pumped with the following three test pump pickles, in which the concentrations of salt, sugar, sodium nitrate and sodium nitrite were the same as in the control Pickle A, but 3.3% tripolyphosphate was replaced by the following ingredients.

Pickle B-2:
   185 grams (0.9%) sodium citrate, and
   371 grams (1.8%) sodium bicarbonate.
Pickle D:
   51.5 grams (0.25%) sodium citrate, and
   247.5 grams (1.2%) sodium hydroxide pellets.
Pickle E:
   103 grams (0.5%) sodium citrate, and
   247.5 grams (1.2%) sodium hydroxide pellets.

These hams were tested for yield and quality characteristics of the finished products and the results are set forth in Table II:

Table II
VC OVAL CANNED HAMS

| Quality Factor | Pumping Pickle | | | |
|---|---|---|---|---|
| | A (TPP) | B-2 (Bicarbonate Citrate) | D (Hydroxide Citrate) | E (Hydroxide 2x Citrate) |
| 1. Total bacterial count per gram pump pickle | 820-120 | 87 | 3-7 | 4-8 |
| 2. Percent pumped | 9.6 | 9.8 | 9.8 | 10.2 |
| 3. Percent gain after 5 days curing in cover pickle | 9.3 | 11.5 | 10.6 | 11.6 |
| 4. Percent gain after curing and 2 days bulking | 9.0 | 8.5 | 10.5 | 11.4 |
| 5. Total protein lost into the cover pickle, grams per gallon [1] | 20.2 | 6.6 | 6.6 | 7.3 |
| 6. Percent can purge | 10.9 | 12.7 | 11.0 | 8.7 |
| 7. Percent yield of the finished product | 97.0 | 95.7 | 97.8 | 101.1 |
| 8. Total moisture, percent | 70.4 | 69.4 | 69.7 | 71.9 |
| 9. pH | 6.29 | 6.47 | 6.38 | 6.54 |
| 10. Salt, percent | 2.88 | 3.01 | 3.34 | 3.46 |
| 11. Sugar, percent | 0.40 | 0.40 | 0.43 | 0.34 |
| 12. Free NaNO$_2$, p.p.m. | 56 | 73 | 135 | 155 |
| 13. Flavor [2] | 3.68 | 3.72 | 3.80 | 3.72 |
| 14. Texture [2] | 3.91 | 3.92 | 4.06 | 4.05 |

[1] One gallon cover pickle was used to cover 2 hams, 10 pounds each.
[2] Explanation given in Table I.

It will be apparent from the data (Tables I and II) that the hams prepared in accordance with this invention are equal to or better (Pickles D and E) in water retention to those prepared using prior art pickling solutions (Pickle A). Moreover, the data indicate conclusively that the flavor, texture and color have also been improved. It was entirely unexpected that by adding the sodium citrate in combination with the alkali hydroxide or carbonates these advantages would occur while at the same time retaining the improved yield of the prior art pickling solutions, without the disadvantages thereof (surface crystals, etc.). Also unexpected is the fact that these results can be achieved at a reduction in the cost of the new pickling solution ranging from 50 to 75% as compared to the cost of sodium tripolyphosphate. The phosphate salts are more expensive than the ingredients of the invention and must be used in larger quantities to produce equivalent effects in cured meat yield. A cost comparison is set forth in Table III below:

Table III
RELATIVE COST OF PICKLE BRINES

| Brine No. | pH Increasing Additives in the Pickle | Relative Cost of the Additives, percent | Percent Reduction in Cost |
|---|---|---|---|
| A | 3.3% TPP | 100 | [1] 0 |
| B-2 | 0.9% Na-citrate, 1.8% NaHCO$_3$ | 37.7 | 62.3 |
| D | 0.25% Na-citrate, 1.2% NaOH Pellets | 15.0 | 85.0 |
| E | 0.5% Na-citrate, 1.2% NaOH Pellets | 23.5 | 76.5 |

[1] The cost of the TPP in the Control A Pickle is taken as the reference cost=100%. The cost of the main pickle ingredients (salt, sugar, NaNO$_2$ and NaNO$_3$), which are present in the same concentrations in all pickles, are not considered in this calculation.

It is also of great importance that the pump Pickles D and E, containing sodium hydroxide and sodium citrate, are practically free of bacteria, due to the high pH of these brines, thus eliminating the bacterial contamination of the product during the curing procedure of hams with these pump pickles.

The fact that the finished hams pumped with the pickling solutions C, D and E are of an acceptable pH, which is below the neutral pH of 7.0, indicates that the free hydroxyl ions of these pickling solutions have been neutralized to water by the meat substance during the processing and do not exist in free form in the finished product.

It will be noted from Table II that after removal of the pumped hams from the curing pickle, the hams pumped with the conventional Pickle A have lost three times as much soluble proteins into the curing pickle than did the hams pumped within the Pickles B-2, D and E. These soluble proteins represent the meat pigment-bearing protein, myoglobin, and the flavor-bearing proteins of pork meat, which are lost to a greater extent from the hams processed with the prior pickling solution (A), than the hams processed by the new pump pickles (B-2, D and E).

The finished product processed with the pickling solutions of the invention (B-2, D and E) contain from 50 to 175% greater quantity of free sodium nitrite than the product processed with the conventional pickle A. The presence of free sodium nitrite in the cured meat products is important for preventing the deterioration of the cured meat pigment during storage of the finished product or during its display in a show case.

Several samples of smoked ham were stored in plastic bags in a 30° F. cooler for 3½ weeks. The ham samples, processed by the conventional tripolyphosphate pump pickle A showed evidence that phosphate crystals, embedded in the meat, had been formed during this storage period. No such crystalline precipitate throughout the meat structure was observed in the ham samples processed with the improved pump pickles (B, B-2, D and E) described herein.

EXAMPLE III

To determine the effect of a sodium hydroxide pickle on the quality of a cured ham the following tests were made. An aqueous pickle solution containing 12½% salt, 2% sugar, 1000 p.p.m. each of NaNO$_2$ and NaNO$_3$, and 1% NaOH (pH 11.82) was injecto-pumped into chilled green hams in the amount of 20% by weight. For comparison, complementary hams were pumped with the same solution except that 2.5% commercial sodium tripolyphosphate (TPP) was used as the pH modifier instead of the sodium hydroxide. The solution had a pH of 8.85. The hams were smoked at low temperature to reduce the amount of added weight to 8%. After smoking the hams were chilled, properly sectioned and canned into 3 pound tins, vacuum sealed, and cooked. The effect of cooking temperature on the pH and the shrinkage is set forth in the following table:

were chilled by cold water to 45° F., stored in 45° F. cooler and subjected to customary quality evaluations.

*Table IV*

| Cooking Temp., °F. | NaOH Pickle Cured Hams | | | | TPP Pickle Cured Hams | | | |
|---|---|---|---|---|---|---|---|---|
| | Outside | | Knuckle | | Outside | | Knuckle | |
| | Percent Shrink | pH | Percent Shrink | pH | Percent Shrink | pH | Percent Shrink | pH |
| Non-cooked cured meat | 0 | 6.75 | 0 | 6.78 | 0 | 6.05 | 0 | 6.20 |
| 120 | 3.2 | 6.75 | 2.0 | 6.75 | 6.0 | 5.95 | 5.2 | 6.18 |
| 140 | 4.0 | 6.72 | 3.6 | 6.70 | 10.0 | 5.95 | 8.8 | 6.18 |
| 150 | 8.0 | 6.70 | 7.2 | 6.68 | 18.0 | 5.98 | 16.0 | 6.20 |
| 160 | 10.4 | 6.68 | 8.0 | 6.65 | 27.2 | 5.99 | 25.2 | 6.22 |
| 170 | 10.4 | 6.62 | 10.0 | 6.63 | 37.2 | 6.00 | 36.0 | 6.25 |
| 185 | 16.0 | 6.88 | 12.4 | 6.60 | 39.2 | 6.05 | 37.2 | 6.35 |
| 212 (Boiling Water) | 18.0 | 6.49 | 14.0 | 6.58 | 44.0 | 6.08 | 42.0 | 6.38 |

The percentage of shrinkage was determined by the loss in weight of a 25 gram sample of lean muscles, in duplicate, after one hour heating at the temperature indicated, and is calculated on the total weight of the sample.

A flavor and texture evaluation was made on the duplicate samples of canned hams heat processed at 165° F. in water followed by 15 minutes at 240° F. After 18 days in cold storage the hams treated with NaOH pickle had a flavor and texture factor substantially equal to those treated with TPP. The slicing quality and firmness of the NaOH hams were judged superior to the TPP hams. The bacterial count of the NaOH hams was found to be lower than the TPP hams.

EXAMPLE IV

To demonstrate the usefulness of sodium hydroxide pickle for injecto-pump curing method without the use of cover pickle cure the following tests were made. An aqueous solution containing 12.4% salt, 0.8% sugar, 1000 p.p.m. each of $NaNO_2$ and $NaNO_3$ was used as the basic cure. Three lots, 750 pounds each, of this basic cure were made into the final pump pickles by adding 2.5% commercial tripolyphosphate (TPP) (control pickle), or 0.7% sodium hydroxide (test pickle 1), or 0.7% sodium hydroxide plus 0.25% sodium citrate (test pickle 2) as the pH modifiers. The resulting pickles had a pH of 8.22, 11.90 and 11.85, and the total bacterial count of 300, 8, and 5 cells/g. pickle, respectively. The pickles were then injecto-pumped into chilled green, deboned hams, 50 hams/group, in the amount of 20% by weight.

Following the pumping the hams were bulked for 1 day in a cooler, smoked at low temperature to reduce the amount of the added moisture to 8%, chilled, sectioned, canned as 3 lbs. oval canned hams, vacuum sealed, and subjected to the pasteurization thermal treatment in a water retort to the internal temperature of 150° F. After cooking the cans (125 samples/group)

The results of this investigation are summarized in the following table:

*Table V*

| Quality Factor | Hams processed with the pickles: | | | |
|---|---|---|---|---|
| | $n^1$ | Control | Test 1 | Test 2 |
| Can purge (shrink), percent | 12 | 13.0 | 10.2 | 10.2 |
| pH: | | | | |
| (a) Ham meat | 10 | 6.20 | 6.34 | 6.44 |
| (b) Purged gelatin | 10 | 6.21 | 6.25 | 6.33 |
| Residual nitrite, p.p.m.: | | | | |
| (a) 4 day cold storage | 2 | 53 | 85 | 125 |
| (b) 35 day cold storage | 2 | 25 | 68 | 58 |
| (c) 90 day cold storage | 2 | 15 | 45 | 45 |
| Flavor score [2] | 8 | 3.74 | 3.78 | 3.74 |
| Texture score [2] | 8 | 3.76 | 3.79 | 3.82 |
| Incubation stability at 100° F.; percent swollen cans: | | | | |
| (a) After 10 days | 40 | 12.5 | 5.0 | 7.5 |
| (b) After 30 days | 40 | 45.0 | 37.5 | 25.0 |

[1] $n$ = Quantity of cans per group used for the tests.
[2] Explanation given in Table I.

As the results indicate, the sodium hydroxide pickles gave highly acceptable products regarding the flavor and texture of the hams. The slicing quality and firmness of the NaOH hams were judged superior to the TPP hams. This refers also to the yield of the hams after opening the cans (lower cooking shrink) and to the can stability during incubation at 100° F. The higher degree of incubation stability of the test hams was due to the sterility of the test pickles and the higher content of the residual free nitrite in the NaOH hams. The TPP control hams in this test showed a relatively high stability on incubation also. It is because the TPP pickle was freshly made for this experiment and contained only 300 cells/ml. pickle. The TPP production plant pickle tested at the same day contained 225,000 cells/ml. pickle after the pickle was recirculated for 3 hours. No such build-up of bacterial population can occur in the NaOH pickles because of their high pH. The pH values of the test hams were all on the acidic side of the neutral point of pH 7.00 and did not differ greatly from the pH of the TPP control hams. This indicates that the ham substance had neutralized all of the added NaOH pickles to water and organic natural salts. A large quantity of the NaOH hams analyzed revealed not a single ham with a pH over 6.8.

EXAMPLE V

This test was designed to demonstrate the usefulness of the NaOH pickle for processing sterile-cooked hams. Such hams are characterized by their shelf-stability without refrigeration and are obtained by the thermal processing of the hams at a temperature over the boiling point of water. Such hams, although not requiring refrigeration, are processed in a small quantity only, because of their "over-cooked" inferior flavor and a very poor texture.

The green deboned hams were processed in the same way as described in Example IV. The control pickle contained 2.5% dissolved TPP, while the test pickle contained 1.0% dissolved NaOH pellets, based on the pickle weight. The hams were injecto-pumped to 20% weight, bulked, smoked, chilled, sectioned, and vacuum sealed in 1½ lbs. oval tins. The thermal heat processing consisted of the autoclave cooking for 95 minutes under 15 lbs. steam pressure and 235° F. retort temperature. Table 6 represents the quality characteristics of the control and test hams.

Table VI

| Quality factor | Ham processed with the pickles: | | |
|---|---|---|---|
| | n | Test | Control |
| Can purge (shrink), percent | 22 | 31.2=5.1 | 25.3=3.5. |
| pH | 22 | 6.29 | 6.47. |
| Flavor score [1] | 6 | 3.79 | 3.75. |
| Texture score [1] | 6 | 3.79 | 3.40. |
| Slicing quality | 4 | Friable, unsuitable for slicing. | ¼ inch slices not friable. |

[1] Explanation given in Table I.

In the case of sterile-cooked hams, the NaOH hams were judged superior to the TPP control hams in the following qualities: yield out-of-can, texture, firmness, and the slicing quality. The control canned hams, subjected to 235° F. temperature treatment, rendered the product which was void of desired texture to the point that the hams were friable and unsuitable for slicing. Due to the greater resistance to the cooking shrink at higher temperatures (Table IV) the NaOH hams could withstand the 235° F. cook without shrinking to the point that the meat could lose all its binding characteristics required for the slicing. The sterile-cooked hams, processed with the NaOH pickle, even when they were made from several small pieces of the cured ham tissue, yielded the product that was held firmly together after cooking, chilling and slicing.

As indicated, the concentration of NaOH in this pickle is inversely proportional to the quantity pumped. Thus, a solution having 0.7% NaOH may be pumped in an amount of from 20 to 26% based on the weight of the ham. The excess moisture may be removed by low temperature smoking to reduce the amount of added weight to 0 or to 8 to 10% as required by Government specifications for the particular cured product.

What we claim as new and desire to secure by Letters Patent of the United States is:

1. In a process for preparing cured meat products from fresh meat by treating said meat with a curing solution consisting of sodium chloride, sugar, and a soluble nitric oxide-forming salt, the improvement comprising the steps of incorporating in said curing solution only sodium hydroxide in an amount sufficient to raise the pH of said solution to 11.5–12.0, and pumping said curing solution into the meat to thereby raise the pH of said meat to between 6.3 and 6.8.

2. In a process for preparing cured meat products from fresh meat by treating said meat with a curing solution consisting of sodium chloride, sugar, and a soluble nitric oxide-forming salt, the improvement comprising the steps of incorporating in said curing solution only sodium hydroxide in an amount of about 0.7–1.5% to provide a pH of 11.5–12.0 for said solution, and pumping said curing solution into the meat to thereby raise the pH of said meat to between 6.3 and 6.8.

3. In a process for preparing cured meat products from fresh meat by treating said meat with a curing solution consisting of sodium chloride, sugar and a soluble nitric oxide-forming salt, the improvement comprising the steps of incorporating in said curing solution only sodium hydroxide in an amount of 1–1.5% to provide a pH of 11.5–12.0 for said solution, the sodium hydroxide concentration being inversely related to the percent of pumping, and pumping said meat with 10–20% of said curing solution to thereby raise the pH of said meat to between 6.3 and 6.8.

4. In a process for preparing cured meat products from fresh meat by treating said meat with a curing solution consisting of sodium chloride, sugar, and a soluble nitric oxide-forming salt, the improvement comprising the steps of incorporating in said curing solution only sodium hydroxide in an amount no greater than 0.7% to provide a pH of 11.5–12.0 for said solution, injecto pumping said meat with 20–26% of said curing solution to thereby raise the pH of said meat to between 6.3 and 6.8, and then removing excess moisture from the cured meat by low temperature smoking to reduce the amount of added weight to less than 10%.

5. A meat curing aqueous solution consisting of sodium chloride, sugar, and a soluble nitric oxide-forming salt, and sodium hydroxide, said sodium hydroxide being present in said solution in an amount of 0.7–1.5% in order to provide the curing solution with a pH of 11.5–12.0.

References Cited by the Examiner

UNITED STATES PATENTS

| 2,956,067 | 5/52 | Brissey | 99—159 |
| 2,770,548 | 11/56 | Hall et al. | 99—222 |
| 2,828,212 | 3/58 | Sair | 99—222 |
| 2,937,094 | 5/60 | Rupp et al. | 99—159 |
| 2,977,235 | 3/61 | Hanus et al. | 99—159 X |
| 3,134,678 | 5/64 | Wierbicki et al. | 99—159 |

A. LOUIS MONACELL, *Primary Examiner.*

HYMAN LORD, *Examiner.*